United States Patent [19]

Mötz et al.

[11] 4,116,501

[45] Sep. 26, 1978

[54] COOLING INSTALLATION FOR THE REDUCTION OF THE OIL TEMPERATURE OF OIL-LUBRICATED DAMPING BEARINGS

[75] Inventors: Karl Mötz, Munich; Josef Meyer, Olching; Josef Schurrer, Deisenhofen, all of Germany

[73] Assignee: Maschinenfabrik Augsburg-Nürnberg Aktiengesellschaft, Munich, Fed. Germany

[21] Appl. No.: 815,220

[22] Filed: Jul. 13, 1977

[30] Foreign Application Priority Data

Jul. 22, 1976 [DE] Fed. Rep. of Germany ....... 2632977

[51] Int. Cl.² ...................... F16C 37/00; F16F 15/16
[52] U.S. Cl. .................................. 308/9; 165/47; 165/185; 308/77; 308/159; 308/DIG. 15
[58] Field of Search ............... 308/77, 76, 9, DIG. 14, 308/DIG. 15, DIG. 4, 172, 121–122, 134.1, 139, 140, 169, 156–159, 163, 168, 153–154, DIG. 1, 144, 145, 15; 165/47, 185, DIG. 7; 184/104 R, 6.18, 6.22

[56] References Cited

U.S. PATENT DOCUMENTS

| 3,020,102 | 2/1962 | Becker | 308/77 |
| 4,022,008 | 5/1977 | Pimiskern et al. | 308/172 X |

FOREIGN PATENT DOCUMENTS 1,212,481 11/1970 United Kingdom ..................... 308/159

*Primary Examiner*—Trygve M. Blix
*Assistant Examiner*—Douglas C. Butler
*Attorney, Agent, or Firm*—Scully, Scott, Murphy & Presser

[57] ABSTRACT

A cooling installation for reducing the oil temperature of oil-lubricated damping bearings, in which a cooling element is employed with one portion thereof in heat-conductive connection with a bearing housing portion, and another portion thereof immersed in the lubricating oil. The cooling element, which is preferably formed of metal wire or strips, may have the end thereof which is immersed in the oil contoured so as to increase its surface contact therewith and to thereby enhance the transfer of heat from the oil to the bearing housing.

8 Claims, 2 Drawing Figures

COOLING INSTALLATION FOR THE REDUCTION OF THE OIL TEMPERATURE OF OIL-LUBRICATED DAMPING BEARINGS

BACKGROUND OF THE INVENTION

1. Field of the Invention

The present invention relates to a cooling installation for the reduction of the oil temperature of oil-lubricated damping bearings and, in particular, pivot or thrust bearings for high-speed rotating bodies.

In friction bearings, pivot bearings, as well as other types of mechanical bearings, the heating of the lubricating oil, which is produced as a result of the frictional heat present at the bearing location, quite often poses a problem. Inasmuch as lubricating oils are poor heat conductors, the heat significantly builds up about the bearings, so as to lead to the premature destruction of the bearing. Moreover, it is frequently worthy of effort to avoid oil vapors which cause undesirable side effects. For instance, in fluid flow engines, side effects can be produced through an admixture of the oil vapors with the flow medium. Similarly, the penetration of oil vapors into the evacuated chamber of a rotor which is driven in a vacuum may be connected with disadvantageous results.

2. Discussion of the Prior Art

A method is known for the avoidance of an increase in the oil temperature, in which the oil reservoir of the bearing is connected to a closed flow circuit wherein, through circulation, the oil as well as the bearing are maintained in a cool condition.

These installations, in many instances, and in particular for rotational bodies operating in a vacuum, have serious technical problems associated with their fabrication, to the point where there is substantial doubt that they may be successfully manufactured at all.

SUMMARY OF THE INVENTION

Accordingly, the invention has as an object the development of an installation of the above mentioned type which can be constructed simply and, nevertheless, will assure a good cooling of the lubricating oil also for extensively driven rotational bodies or rotors.

The foregoing object is inventively achieved through a cooling element which is constructed from a heat-conductive material which, on the one hand, is in heat-conductive communication with a cooled housing portion of the bearing and, on the other hand, immerses or dips into the lubricating oil.

That type of element which, for example, can be formed from copper or aluminum, may be easily coordinated with the respective bearing construction through suitable configuration in a manner wherein neither the spatial requirements nor the construction, of for instance, an already existent bearing need be changed.

Such shaped elements can be easily constructed and, without extensive demands welded to, for example, housing components.

The heat transfer can, in an inventive manner, be particularly advantageously increased by means of specialized contours such as slits, spiral threads and/or bores, which increase the contact surface between the oil and the cooling element.

It is also advantageous that the oil movement which is driven, for example, by means of a bearing spindle, be utilized for heat transfer. For this purpose, the invention provides that the cooling element encompasses the bearing location and is provided with flow-guiding slits or bores.

In this manner the oil flow can be suitably directed and thereby the heat transfer, as well as the oil infeed to the friction bearing, be optimally influenced.

The inventive cooling element further has the advantage that, through suitable configuration, it may be concurrently employed as the cover of the oil-filled chamber so as to reduce the oil vapor quantity which penetrates into the chamber of the rotational body.

The loss of oil vapors from the bearing space can be further reduced when, inventively, the cooling element is arranged on the inside of a cylindrical part encompassing the bearing location, respectively, the bearing shaft retainer, and is provided with spiral ridges and which, in conjunction with the rotating bearing shaft retainer, forms a molecular pump.

In this manner the oil vapors can be continuously pumped back into the bearing space without any significant quantity thereof penetrating into the rotational body chamber or space.

A further improvement in the heat transfer can inventively be achieved when the cooling element is heat-conductively connected with the support bearing through the intermediary of resilient elements, for example, metal wire or strips. In this manner it is possible to have a direct heat transfer from the heat source to the cooling element, respectively, to the cooler housing components without adversely influencing the freedom of movement of the support bearing.

In many instances the support bearing is connected with a hydraulic damping installation wherein the damping element, which for example, is connected with the support bearings, immerses or dips into a damping liquid and is connected with the damping housing by means of resilient elements (for example, a membrane). In bearings of that type it is possible that during the unexpected destruction of the rotational body into splinter parts, that the membrane is destroyed, so that the damping oil can then penetrate into the rotational body chamber. In these instances the inventive cooling element can also serve as a protective shield, in that it is concurrently constructed for the covering of the damping arrangement.

BRIEF DESCRIPTION OF THE DRAWINGS

Exemplary embodiments pursuant to the invention are described below and schematically illustrated in the drawings; in which.

DETAILED DESCRIPTION

Figure 1:
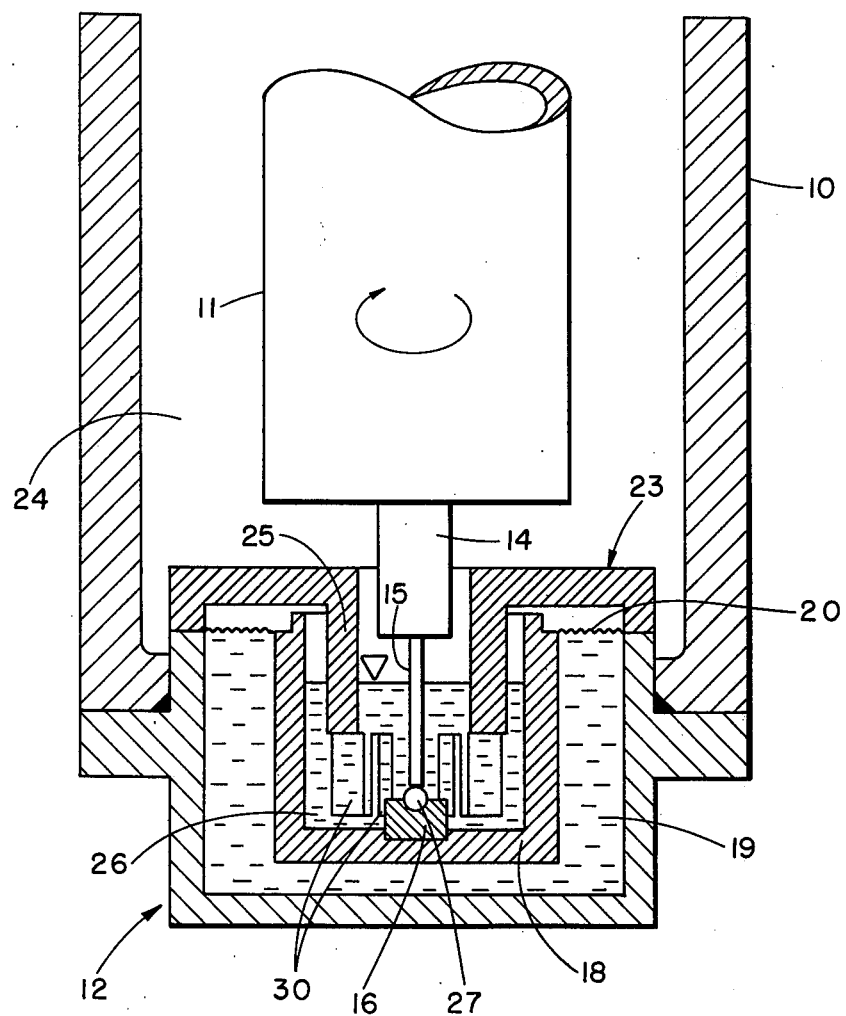
FIG. 1 illustrates a first embodiment of a cooling installation constructed pursuant to the invention.

In FIG. 1, a rotational body 11 which is arranged within a housing 10, is illustrated together with its lower damping bearing 12. The rotational body supports itself by means of a pivot or trunnion retainer 14 and a pivot shaft 15 on a support bearing 16. A damping cylinder 18 is rigidly connected to the support bearing 16 and is constructed to simultaneously receive the lubricating oil 26 and to support the bearing socket 16. The damping cylinder is resiliently coupled to the housing 10 by means of a membrane 20 which concurrently serves as a seal for the damping liquid chamber.

Further provided is a cooling element 23 having a high heat-conductive capacity, which is arranged within the housing chamber 24 of the rotational body 11 and which almost completely covers the damping bearing with regard to this chamber. The outer rim of the cooling element is welded together with the housing 12. The cooling element projects into the lubricating oil 26 by means of a concentric axial hollow cylindrical component 25, and thereby encompasses the pivot shaft retainer 14, the pivot shaft 15, and the bearing location 16, 27.

The frictional heat which is generated by the rotational movement at the bearing location 16, 27 is transferred to the oil which encompasses this location. The conducting away of the heat is then effected through the cooling element 23, which finally transfers the heat to the housing 10. In order to improve the heat transfer between the oil 26 and the cooling element 23, the cylindrical component 25 is provided with axial slits 30 which optimally guide the oil which has been set into movement by means of the pivot shaft 15 so that the heat transfer, as well as the oil flow to the bearing, can be improved.

The heat transfer can be further enhanced through heat-conductive strips 32 (FIG. 2) which, being connected with the support bearing 16 and the cooling element 33 afford a direct and improved heat transfer from the bearing location to the cooling installation. Through suitable design of the rigidity of these elastic strips 32, the damping property of the bearing remains uninfluenced, or may even improve itself. The strips 32 can evidence a contour which enhances the flow of the oil and also, when combined with apertures or bores formed in the cylindrical portion of the cooling installation 33, afford an optimum transfer of the friction heat. The heat dissipation is proportional to the contacting surfaces of the bodies between which the heat transfer takes place. In effect, the apertures 30 or the bores will enhance the contacting surface between the oil and the member. On the other hand, the noses left between the apertures or slits 30 of the member 33 as well as the strips 32 contribute to stir the oil which is set in motion by the rotating members. Accordingly, this feature contributes to the enhancement of the heat transfer.

Figure 2:
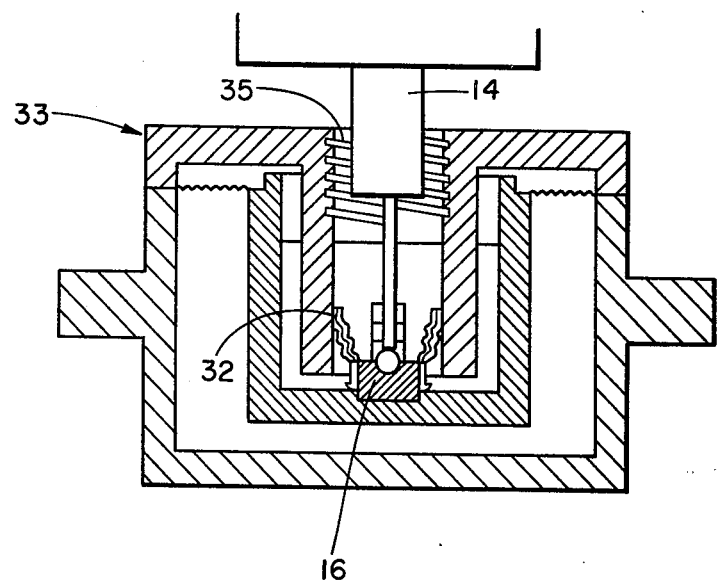
FIG. 2 illustrates a second embodiment of the invention.

The cooling element 23, or 33 in FIG. 2, serves as a vacuum-tight cover and also as a mechanical shielding for the damping bearing 12. The cooling element covers the damping cylinder 18, to thereby reduce the oil surface area facing the chamber which results in a reduction in the quantity of oil vapor lost.

In order to prevent the loss of the oil vapor which is developed within the cylinder 25, this cylinder is provided with spiral grooves 35 which, in connection with the rotating pivot shaft retainer 14, form a molecular pump which will again suppress the oil vapors.

What is claimed is:

1. A cooling installation for reducing the temperature of an oil-lubricated, damped thrust bearing, for a vertically oriented high speed rotational body, having a bearing housing and an oil reservoir for the lubricating oil in which the bearing is immersed, comprising a cooling element constituted of a heat-conductive material substantially encompassing the bearing, said cooling element being in heat-conductive connection with the bearing housing and being at least partially immersed in the lubricating oil.

2. Installation as claimed in claim 1 said cooling element having an end portion immersed in said lubricating oil, said end portion having means for increasing its surface area to provide increased contact with the oil.

3. Installation as claimed in claim 2, said means for increasing comprising slits formed in said end portion.

4. Installation as claimed in claim 2, said means for increasing comprising spiral threads formed on said cooling element.

5. Installation as claimed in claim 1, said cooling element having a central hollow cylindrical portion, spiral grooves being provided on the inner surface of said portion, and a rotating element being located within said hollow cylinder and forming a molecular pump in combination with said spiral grooves.

6. Installation as claimed in claim 1, said cooling element comprising a plurality of resilient elements forming a heat-conductive connection of the cooling element with a support bearing of the bearing.

7. Installation as claimed in claim 6, said resilient elements comprising metal wires.

8. Installation as claimed in claim 6, said resilient elements comprising metal strips.

* * * * *